May 25, 1965  KANESUKE IWASAKI  3,185,232
SPRING BALANCE

Filed Feb. 12, 1964  2 Sheets-Sheet 1

Inventor
Kanesuke Iwasaki
by
Bierman & Bierman
Attorneys

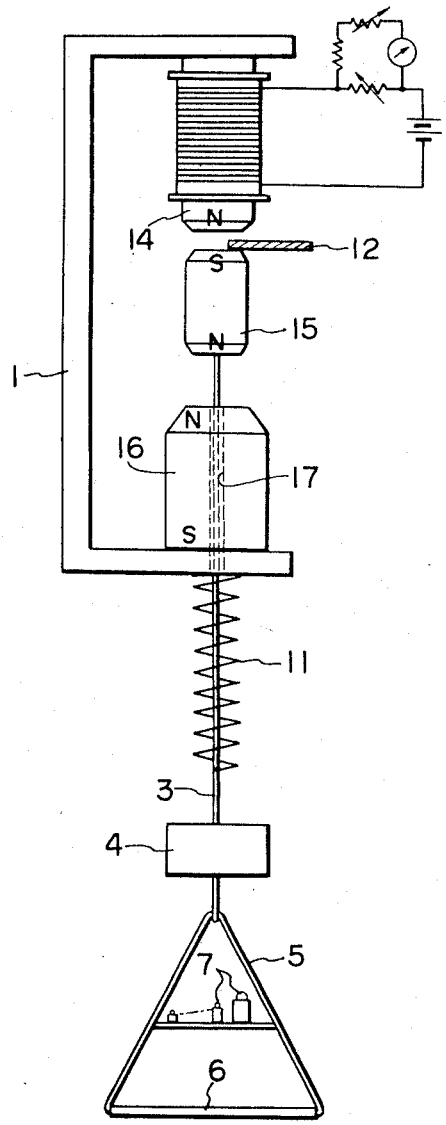

United States Patent Office 3,185,232
Patented May 25, 1965

3,185,232
SPRING BALANCE
Kanesuke Iwasaki, Ichikawa, Japan, assignor to Sankyo Company, Ltd., Chuo-ku, Tokyo, Japan, a corporation of Japan
Filed Feb. 12, 1964, Ser. No. 344,271
11 Claims. (Cl. 177—225)

This invention relates to a spring balance which has a new and simple construction.

With advancement in the modern art of measurement, a rapid improvement has been achieved in gravimetry, particularly in accuracy of a balance. A conventionally known balance comprising a fused-quartz spiral spring mechanism has a serious disadvantage in that its weighing range is very narrow because the scaling in this mechanism is effected within the residual elastic limit of a spring on which the load of suspending means and pans of the balance has been impressed.

Accordingly, the objects of the present invention are to overcome the above-mentioned disadvantage by employing a new and simple construction and further to improve the weighing range of a spring balance. In accordance with the present invention, there is provided a spring balance characterized in that a magnetized substance or a magnet is provided on the top end of an operating body which is provided with a scaling mechanism including balance weights, a metal suspending fixture, a pan and other associated elements and with a detecting means, e.g. an optical scale or an electric detector. Another magnet is provided on the vertical central axis of said operating body in suitably spaced relation to said magnetized substance or magnet; and a spiral spring is attached at its bottom end to said operating body and fixed at its top end to a frame.

Figure 1:
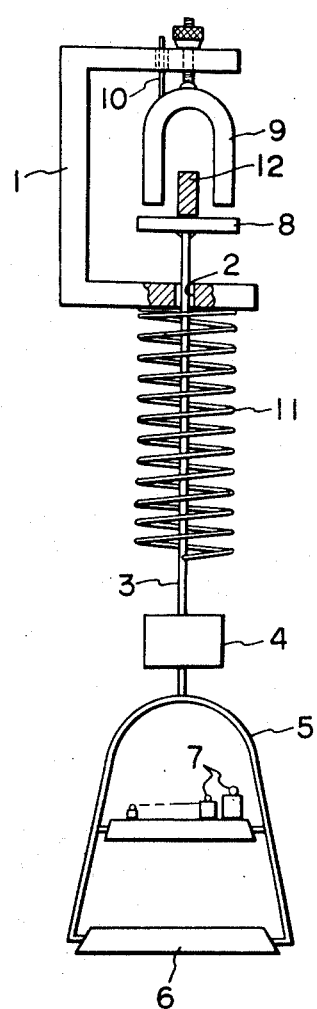
Figure 2:
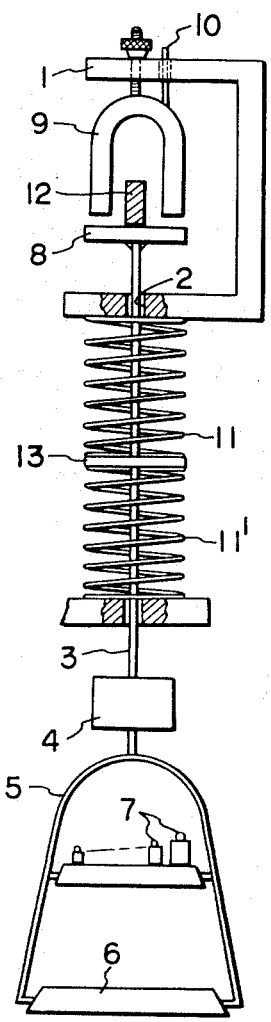

Several embodiments of a spring balance of the present invention will be explained in reference to the accompanying drawing in the following description:

In the accompanying drawing, FIGS. 1, 2, and 3 respectively represent side elevational views of embodiments of the present invention with some parts being shown in cross-section.

Referring to FIG. 1, a frame 1 is provided with a bore 2, through which a rod 3 as an operating body is loosely inserted. On the lower portion of the rod 3 are fixed an optical scale 4 and a pan 6 therebeneath, with a suspending device 5 intervening between the optical scale 4 and the pan 6. On the suspending device are loaded many groups of balance weights varying within a wide range.

On the top end of the above operating rod 3 is fixed a magnetized substance 8, above which a vertically movable permanent magnet (or an electromagnet) 9 on the frame 1 is suitably spaced from to the substance 8. A controlling rod 10 is vertically provided at one side of the magnet 9 to be inserted through the frame 1. The magnet 9 is arranged to make its force of attraction work in the direction of the vertical axis of the operating rod 3. The upper end of a fused-quartz spiral spring 11 is attached to the bottom end of the frame 1 and its bottom end is fixed on the operating rod 3. The character 12 in the drawing represents a stop member keeping the magnetized body 8 from being attracted into contact with the magnet 9.

According to the present invention, the weight of the operating mechanism including the spring 11 is supported by the force of attraction of the magnet 9 and an ideal state for the sealing to be effected is a state of no gravity, that is, a balanced state in which the total weight load of the operating mechanism is equivalent to the force of attraction of the magnet. For in such a state the limit of the scaling is as wide as the elastic limit of the spring allows.

In FIG. 2, two spiral springs 11, 11' are provided in the vertical end-to-end relation each to the other between a frame 1, with a metal connector 13 interposed between the springs and fixed on rod 3. Thus, the variation in elasticity due to temperature may be automatically compensated.

In FIG. 3, a permanent magnet 15 is mounted on an operating rod 3 so that it and an electromagnet 14 fixed to a frame 1 may attract each other. The operating rod 3 is inserted through a central bore 17 of a permanent magnet 16 mounted on the lower portion of the frame 1. The permanent magnet 16 and the magnet 15 are arranged in the mutually repelling relation.

When the operating rod 3 moves downwardly, a rapid decrease in the force of attraction occurs between an electromagnet 14 and the permanent magnet 15 is compensated by the repelling force between the magnet 15 and the magnet 16 so that in the evaluation only the load to be weighted acts on the spring 11. With a result, the weighing range of the balance is increased and is made accurate.

According to the constitution of the present invention as specified above, the operating mechanism is kept at a standstill and the substance to be weighted is placed on a pan and the balance weighs corresponding to the weight of the substance are removed and then the operating mechanism is placed in motion. Thus, the weight difference between the total of the balance weights and the weight of the substance to be weighed may be obtained by a detecting means.

The present invention has excellent advantages in its giving a larger range of determination and better accuracy of determination than the conventional balances. For, according to the present invention the weight load of the operating mechanism is reduced or practically compensated by the force of attraction of the magnet, so that the acting range of the spring relative to its elastic limit is made large.

What I claim is:
1. A spring balance comprising a frame, a first magnetized body fixed in said frame, a second magnetized body vertically below and spaced from said first body, a vertical rod fixed to said second body and depending therefrom, a coil spring member surrounding said rod below said frame, said spring member having one end attached to said frame and the other end attached to said rod, and a weight holder attached to the lower portion of said rod.

2. A spring balance according to claim 1 characterized in that a detecting device is attached to said rod.

3. A spring balance according to claim 1 characterized in that said rod passes thru an opening in the lower part of said frame.

4. A spring balance according to claim 1 characterized in that a stop member in said frame is interposed between said magnets to prevent contact therebetween.

5. A spring balance according to claim 1 characterized in that said spring member comprises a pair of coil springs having a connector interposed therebetween and secured to said rod.

6. A spring balance according to claim 1 characterized in that the poles of said magnetic bodies are in position for mutual attraction.

7. A spring balance according to claim 1 characterized in that said first body is an electromagnet and said second body is a permanent body.

8. A spring balance according to claim 1 characterized in that a third magnetized body is vertically below said second body and is fixed on said frame.

9. A spring balance according to claim 8 characterized in that said first and second bodies are in position for mutual attraction.

10. A spring balance according to claim 8 characterized in that said first and second bodies are in position for mutual attraction, and said third body is in position for mutual repelling.

11. A spring balance according to claim 8 characterized in that said rod passes thru said third body.

References Cited by the Examiner
UNITED STATES PATENTS

| | | | |
|---|---|---|---|
| 661,158 | 11/00 | Stoelting et al. | 177—225 |
| 2,559,919 | 7/51 | Gustafsson | 177—210 X |
| 3,123,165 | 3/64 | Carson et al. | 177—208 |

FOREIGN PATENTS

| | | |
|---|---|---|
| 634,128 | 8/36 | Germany. |
| 962,593 | 6/40 | Germany. |

LEO SMILOW, *Primary Examiner.*